United States Patent [19]

Burch

[11] Patent Number: 4,914,906

[45] Date of Patent: Apr. 10, 1990

[54] TURBINE STARTER DEVICE

[75] Inventor: Darrel W. Burch, Phoenix, Ariz.

[73] Assignee: Allied-Signal Inc., Morris Township, Morris County, N.J.

[21] Appl. No.: 197,945

[22] Filed: May 24, 1988

[51] Int. Cl.[4] .............................................. F02C 7/277
[52] U.S. Cl. .................................... 60/39.142; 192/42
[58] Field of Search ............. 60/39.142; 192/42, 48.92

[56] References Cited

U.S. PATENT DOCUMENTS

| | | | |
|---|---|---|---|
| 2,631,426 | 3/1953 | Jewett | 60/39.142 |
| 2,721,482 | 10/1955 | Shank et al. | 60/39.142 |
| 2,972,411 | 2/1961 | Volk et al. | 60/39.142 |
| 3,003,313 | 10/1961 | Bunger | 60/39.142 |
| 3,266,251 | 8/1966 | Kacek | 60/39.142 |
| 3,279,169 | 10/1966 | Bayard | 60/39.142 |
| 3,521,505 | 7/1970 | Sebring | 60/39.142 |
| 3,638,774 | 1/1972 | Burch et al. | 192/42 |

Primary Examiner—Louis J. Casaregola
Attorney, Agent, or Firm—David B. Abel; James W. McFarland; Robert A. Walsh

[57] ABSTRACT

A double clutch mechanism is disclosed for use within a starter assembly for selectively coupling power to start a turbine engine. The invention includes a primary engagement assembly and a secondary engagement assembly, either of which may be of the pawl and ratchet type or the sprag type, for coupling power to the engine and preventing overrunning of the starter assembly.

16 Claims, 4 Drawing Sheets

TURBINE STARTER DEVICE

TECHNICAL FIELD

This invention relates to clutch mechanisms for selective power transmission between a starter means and an engine. More particularly, the invention discloses a double pawl and ratchet clutch assembly for use in selectively coupling a turbine driven starter assembly with a gas turbine engine to affect the starting of the gas turbine engine. The clutch assembly is specifically designed so that the starter drive means can never rotate at speeds greater than the driven output to the gas turbine engine, while allowing controlled engagements for running restarts of the gas turbine engine.

BACKGROUND ART

Turbine driven starters for starting gas turbine engines have been in use for a number of years. Examples of representative patents include U.S. Patent Nos. 2,909,166; 3,087,305; 3,238,721; 3,521,505, all of which are assigned to the assignee of the present invention, as well as U.S. Pat. No. 2,224,322. These patents depict a starter having a turbine adapted to receive motive gas flow producing output rotation of a shaft. The shaft is coupled by various types of gear means and possibly a clutch to an output shaft connected to the gas turbine engine. By this arrangement, the motive gas flow impinging on the turbine commences a start cycle wherein the rotating assembly within the gas turbine engine is rotationally driven up to a threshold speed required for initiating self-sustained combustion within the engine. Once self-sustained combustion exists within the gas turbine engine, the motive gas flow to the engine is shut off and the clutch within the starter decouples with the engine side of the clutch being driven by the engine.

Various clutches such as those described within the above cited patents have been utilized to engage/disengage the starter unit from the engine. Another patent which is particularly directed toward the clutch is U.S. Pat. No. 3,638,774, having a common inventor with the present invention, and herein incorporated by reference. The 3,638,774 patent describes a clutch having a set of pivotally mounted pawls carried on the output shaft which pawls are radially inwardly biased by leaf springs to engage ratchet teeth on a cylinder driven by the turbine. Upon attaining a desired disengagement speed, the centrifugal forces on the pawls may overcome the spring biasing force and the pawls will pivot out of engagement with the ratchet, thus disengaging the starter unit.

In certain circumstances a problem with the clutch of the 3,638,774 patent may occur during a restart of an engine which is coasting down from a rotational speed above the threshold disengagement speed. Under this circumstance, when the start cycle is initiated, the turbine and associated ratchet will rapidly accelerate to a rotational speed in excess of the threshold disengagement speed. While the engine is coasting down and the starter is accelerating, the forces exerted by the biasing springs and the actuator elements will generally not be large enough to overcome the centrifugal force preventing the pawls from engaging the ratchet. Thus, when the engine has slowed down tot he threshold disengagement speed and the pawls are biased into engagement with the ratchet, there will be a speed differential between the engine and the ratchet which will cause a deleterious jarring or "crash engagement" to occur, potentially damaging the clutch assembly.

It would therefore be beneficial to have a clutch means for a gas turbine engine starter unit designed such that the driving member will not attain a rotational speed in excess of the driven member and thereby eliminate the possibility of "crash engagements" of the starter unit.

DISCLOSURE OF THE INVENTION

The present invention discloses a gas turbine engine starter assembly having a double pawl and ratchet clutch means to selectively engage/disengage the starter and the engine, yet which prevents "crash engagements" of the starter assembly during engine restarts. The clutch means preferably includes a primary set of pawls pivotally mounted on the driven member to unidirectionally engage a radially inward ratchet cylinder under bias from leaf springs, and a secondary set of pawls pivotally mounted on the driving member to unidirectionally engage a radially outward ratchet cylinder.

BEST MODE FOR CARRYING OUT THE INVENTION

Figure 1:
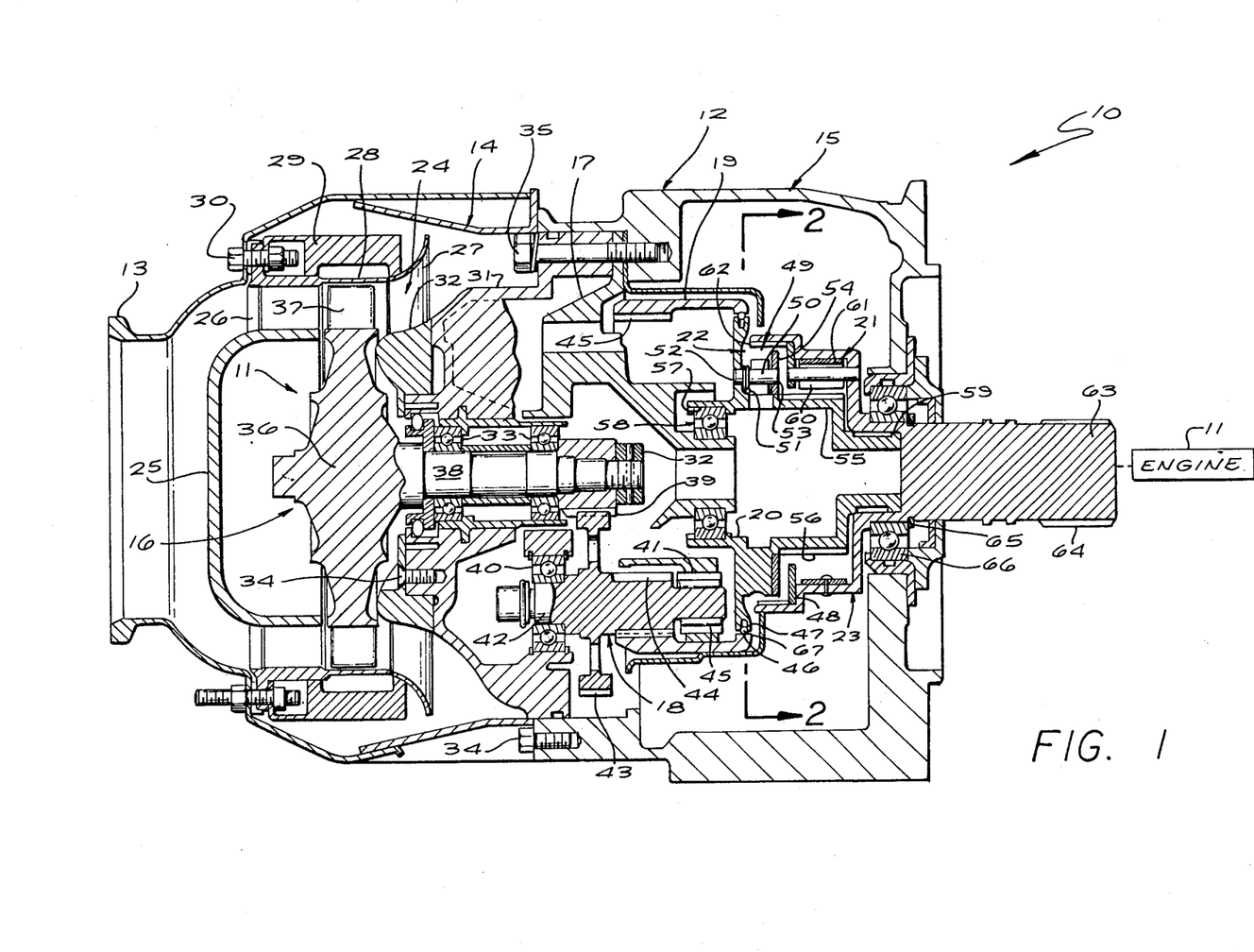
FIG. 1 is a partially cross sectional, partially schematic view of a turbine engine and starter assembly.

FIG. 1 shows a cross sectional view of a starter assembly 10 for use with a gas turbine engine 11. The starter assembly 10 includes a three piece housing 12. The three piece housing 12 is made up of an inlet housing assembly 13, central housing assembly 14 and a gear housing 15. Contained within the three piece housing 12 is a turbine rotating assembly 16, a carrier assembly 17, a set of matched gear assemblies 18, a gear spur 19, hub internal gear assembly 20, primary engagement assembly 21, secondary engagement assembly 22, and drive shaft assembly 23. A turbine ducting assembly 24 including turbine shield 25, stator 26, diffuser 27 and mounting ring 28, as well as a turbine containment ring 29, is mounted by bolts 30 to the inlet housing assembly 13. A turbine support assembly 31 including a turbine backside shield 32 and bearing assembly 33 as well as the carrier assembly 17, and central housing assembly 14, are attached by sets of bolts 34, 35 to the gear housing 15. The turbine rotating assembly 16 includes a turbine wheel 36 having a plurality of blades 37 at its outer circumference, a turbine shaft 38 extending from the center of the turbine wheel 36, and a sun gear 39 attached to the end of the turbine shaft 38. The turbine shaft 38 extends through the turbine support assembly 31 and is retained within the bearing assembly 33 thereof.

There are preferably three matched gear assemblies 18 equally spaced circumferentially about the sun gear 39, each being mounted within bearing supports 40, 41 of the carrier assembly 17. Each matched gear assembly 18 includes a central shaft 42 supported at its ends by the bearing supports 40, 41. The central shaft 42 carries a planet gear 43, which is driven by the sun gear 39 of the turbine support assembly 31, and a driving gear 44. The driving gears 44 of matched gear assemblies 18 all cooperate to drive the gear spur 19 which is generally cylindrical and includes radially inwardly disposed gear teeth 45 at one end of the cylinder which mesh with the driving gear 44 of gear assemblies 18. The other end of gear spur 19 includes internal teeth 46 which engage and drive hub teeth 47 at an outer periphery of a disk shaped portion of the hub internal gear assembly 20.

Figure 2:
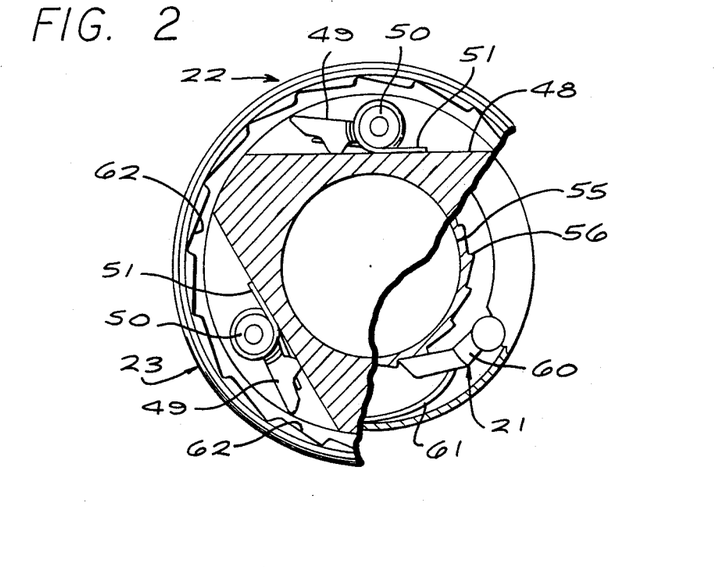
FIG. 2 is a partially cutaway elevated cross-section of the primary and secondary pawl and ratchet clutch assemblies taken along line 2—2 of FIG. 1, depicted in the first stage startup configuration.

The hub internal gear assembly 20 preferably has a generally triangular shaped projection 48 extending from the disk shaped portion as shown in FIG. 2. The secondary engagement assembly 22 preferably includes a set of three secondary pawls 49 on integral pawl shafts 50, position biased by a set of pawl springs 51, which are mounted along the three sides of the triangular shaped projection 48 of hub internal gear assembly 20. The pawl shafts 50 are secured at one end within holes 52 provided within the disk shaped section, the other ends of pawl shafts 50 project into holes 53 provided in a retaining washer 54 which butts against and is fixedly secured to the generally triangular shaped projection 48. A generally cylindrical projection 55 extends from the triangular shaped projection 48, the generally cylindrical projection 55 having a plurality of external ratchet teeth 56 disposed thereon. The hub internal gear assembly 20 further includes an internal bearing race 57 which is supported by a bearing 58 mounted on the carrier assembly 17, and a safety alignment stub 59 which projects into a cavity of drive shaft assembly 23 but normally runs clear.

The drive shaft assembly 23 carries the primary engagement assembly 21, which preferably includes a set of three primary pawls 60, which are radially inwardly biased by resilient leaf springs 61, and disposed so as to engage the external ratchet teeth 56 of the hub internal gear assembly 17. Additionally, the drive shaft assembly 23 includes internal ratchet teeth 62, disposed radially outward of the secondary pawls 49. The primary engagement assembly 21 and the internal ratchet teeth 62 are contained within the rim of a generally cup shaped section of drive shaft assembly 23, the cup shaped section being disposed about the secondary engagement assembly 22 and external ratchet teeth 56 of hub internal gear assembly 20. The drive shaft assembly also includes drive shaft 63 which extends away from the outer base of the cup shaped section. Drive shaft 63 includes means for engaging the engine 11, here shown as spline teeth 64 located at the end of drive shaft 63, as well as a bearing race 65 positioned near the midpoint of drive shaft 63 which allows support from the gear housing 15 via drive shaft bearing 66.

In operation, the starter assembly of FIG. 1 is attached via the inlet housing assembly 13 to a source of motive gas flow (not shown). The motive gas flow is ducted to impinge on the turbine blades 37 causing rotation of the turbine wheel 36 and turbine shaft 38, as well as the sun gear 39 at a relatively high speed but with low torque. The sun gear 39 meshes with the three planet gears 43 causing rotation thereof about their respective central shafts 42, the central shafts 42 being positionally fixed with respect to the carrier assembly 17. The driving gears 44 of the central shaft 42 mesh with the gear teeth 45 of the gear spur 19 causing the rotation thereof. This gear arrangement produces a reduction of the rotational speed of the carrier assembly 17 with respect to the turbine shaft 38 in the range between about 5 to 1 and 30 to 1, while simultaneously increasing the available torque. The internal teeth 46 of the gear spur 19 are adapted to mesh with the hub teeth 47 of the hub internal gear assembly 20 and are axially positionally fixed thereto by a spring clip 67, thus, the hub internal gear assembly 20 is made to rotate synchronously with the gear spur 19.

The hub internal gear assembly 20 may rotationally drive the drive shaft assembly 23 via the primary and secondary engagement assemblies 21, 22. The drive shaft assembly 23 in turn is connected to the gas turbine engine 11 so as to synchronously rotate with the rotating group (not shown) thereof. Upon attaining a nominal rotational speed of the rotating group, combustion is initiated within the gas turbine engine 11, which combustion is then continuous and drives the rotating group thereof to a much higher speed. Once combustion is initiated, the starter assembly 10 assists the engine 11 until a self-sustaining speed is attained, at which time starter assembly 10 is no longer required to power the engine 11 and thereafter may be shut off.

FIGS. 2–5 show more detailed views of the primary and secondary engagement assemblies 21 and 22, of FIG. 1 during the various operational modes of the starter assembly 10.

FIG. 2 depicts the configuration of the primary and secondary engagement assemblies 21, 22 during a normal start cycle. The three secondary pawls 49 pivotally mounted via pawl shafts 50 to the internal hub gear assembly 20 are biased by pawl springs 51 so as to not engage the internal ratchet teeth 62 of the drive shaft assembly 23. The three primary pawls 60, pivotally mounted on, and carried by, the drive shaft assembly 23 are radially inwardly biased by leaf springs 61 so as to contact and engage the external ratchet teeth 56 of the internal hub gear assembly 20. Thus, the drive shaft assembly 23 is driven by the internal hub gear assembly 20 by the engagement of the primary pawls 60 with the external ratchet teeth 56.

Figure 3:
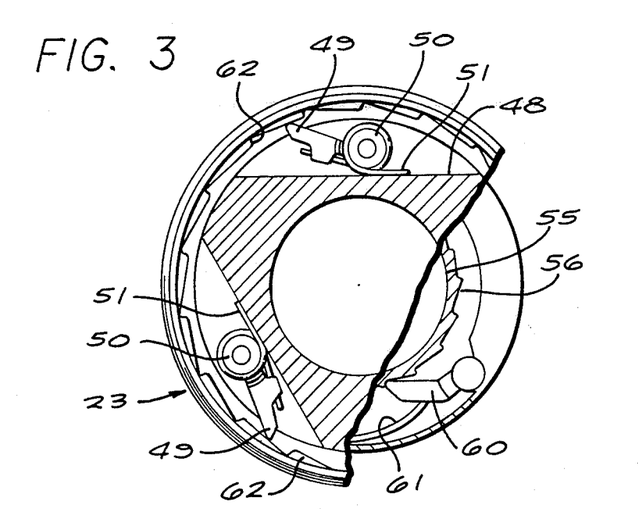
FIGS. 3-5 are views similar to FIG. 2 but with the primary and secondary pawl and ratchet clutch assemblies respectively shown in configurations at the second stage startup, shortly after an engine start, and with the starter shut off and the engine running.

FIG. 3 shows the configuration as the rotational speed of the internal hub gear assembly 20 creates a centrifugal force acting on the secondary pawls 49 which overcomes the bias force exerted by pawl springs 51. Upon reaching a first threshold rotational speed, the secondary pawls 49 rotate radially outward about their respective pawl shafts 50 and into contact with the internal ratchet teeth 62 of the drive shaft assembly 23. As the rotational speeds continue to increase, a second threshold speed is attained at which speed the centrifugal forces acting on the primary pawls 60 would be sufficient to rotate the primary pawls 60 radially outward against the bias forces exerted by the leaf springs 61 and out of engagement with the external ratchet teeth 56. However, as long as the primary pawls 60 are transmitting torque from the hub internal gear assembly 20 to the drive shaft assembly 23, the primary pawls 60 remain engaged to the external ratchet teeth 56.

Figure 4:
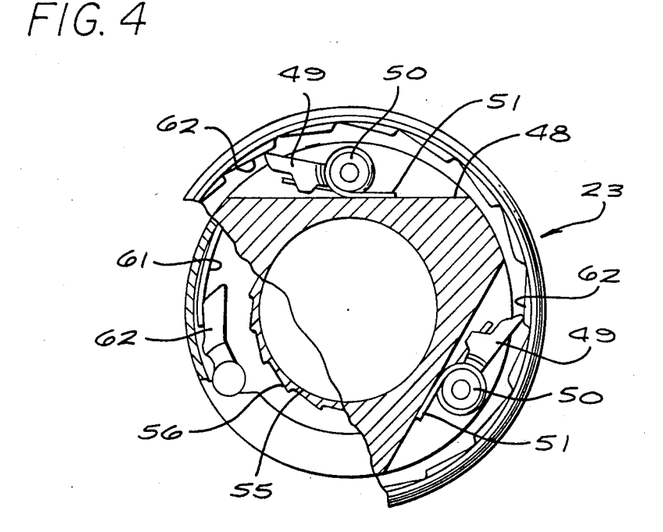
Figure 5:
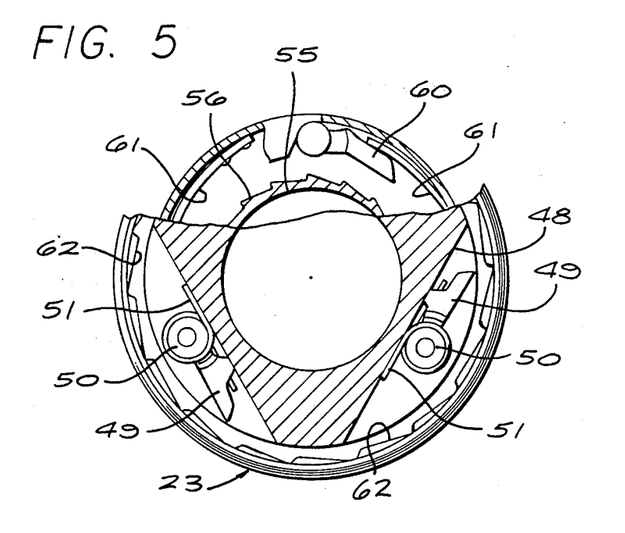

The hub internal gear assembly 20 continues to drive the drive shaft assembly 23 via the primary pawls 60 until the gas turbine engine 11 is accelerated to a self-sustaining combustion speed. The engine 11 will then accelerate itself to a much higher speed. The rotational speed of the drive shaft assembly 23 is fixed with respect to the speed of the engine, and exceeds the rotational speed of the hub internal gear assembly 20 when the motive gas flow to the starter assembly 10 is discontinued. At this point, there will no longer be any torque transferred by primary pawls 60 and centrifugal force causes primary pawls 60 to pivot out of engagement. This occurs at the disengagement speed of the starter. Thereafter, the secondary pawls 49 start to ratchet into contact with succeeding internal ratchet teeth 62 as shown in FIG. 4, until the rotational speed of the hub internal gear assembly 20 decreases to a speed less than the first threshold speed. At speeds below the first threshold speed, the secondary pawls 49 are biased by pawl springs 51 so as to no longer contact the internal ratchet teeth 62 and the engine 11 can run free. The hub internal gear assembly 20, as well as the turbine rotating assembly 16 and matched gear assemblies 18 then continue to slow to a stop as shown in FIG. 5.

FIG. 4 can also be used to depict a relatively high speed engine restart condition. For a high speed restart, the drive shaft assembly 23 is coasting down from a relatively high rotational speed and thus the primary pawls 60 are subjected to the centrifugal forces acting thereon so as to be pivoted out of contact with external ratchet teeth 56 of the hub internal gear assembly 20. Meanwhile, the flow of motive gas to the starter assembly 10 is initiated, driving the turbine rotating assembly 14 and ultimately the hub internal gear assembly 20. The hub internal gear assembly 20 rapidly accelerates past the first threshold rotational speed at which point the secondary pawls 48 pivot radially outward so as to contact and ratchet to successive internal ratchet teeth 62 of the drive shaft assembly 23. The hub internal gear will continue to accelerate until either reaching la maximum free running speed or reaching a synchronous speed with the drive shaft assembly 23. When the drive shaft assembly 23 slows to the maximum speed, or at a synchronous speed, the secondary pawls 49 engage the internal ratchet teeth 62 to provide driving torque to the drive shaft assembly 23. Within this sequence, a smooth engagement of the starter assembly 10 is accomplished and the rotational speed of the engine 11 at which the starter assembly 10 engages during a restart can be maximized, facilitating a quicker restart of the engine 11. In he event that the drive shaft assembly 23 has coasted down to a speed below the second threshold speed, the primary pawls 60 are biased inward by pawl springs 61 and will ratchet until a synchronous speed is attained with the hub internal gear assembly 20, at which speed a smooth running engagement of the primary pawls 60 occurs. Thus, by the combined actions of the primary and secondary engagement assemblies 21, 22, under no circumstances will the rotational speed of the driving assembly, here the hub internal gear assembly 20, exceed the rotational speed of the driven assembly, drive shaft assembly 23.

Figure 6:
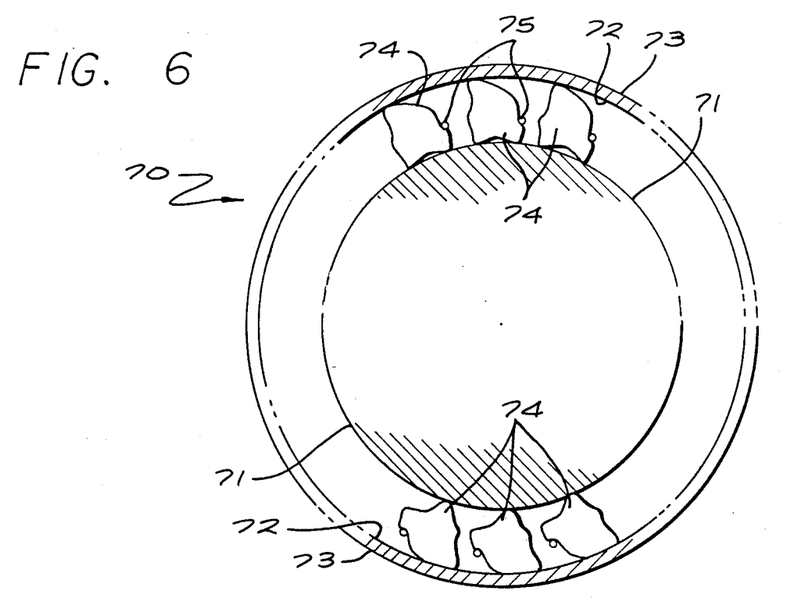
FIG. 6 shows a cross-sectional schematic view of a sprag clutch which may be incorporated as an alternate to the primary pawl and ratchet clutch of FIG. 1.
Figure 7:
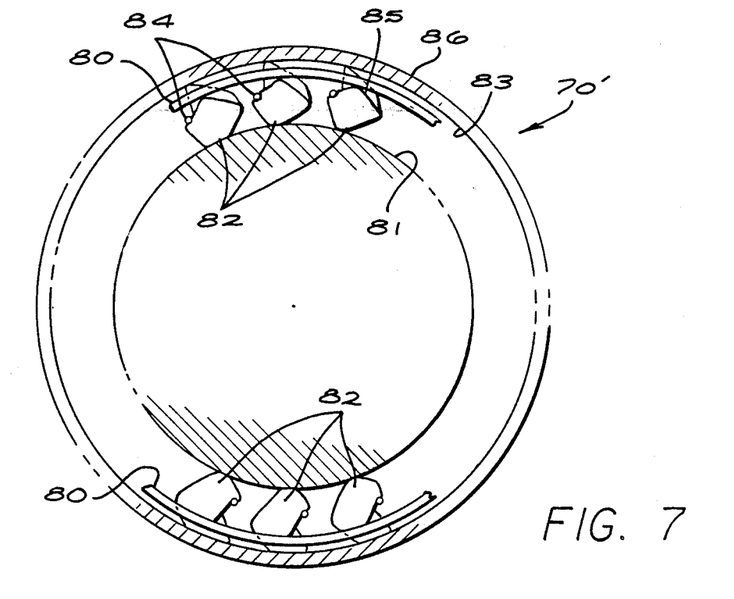
FIG. 7 shows a cross-sectional schematic view of a second sprag clutch which may be incorporated as an alternate to the secondary pawl and ratchet clutch of FIG. 1.

FIGS. 6 and 7 show designs for sprag clutches 70, 70' which may be used within the primary engagement assembly 21 and/or the secondary engagement assembly 22, to replace the primary pawls 60 and/or secondary pawls 49, as well as internal ratchet teeth 62 and external ratchet teeth 56. The sprag clutch assembly 70 includes a cylindrical driving race 71 positioned radially inward of an internal race 72 of a radially outer cylinder 73. Positioned between the cylindrical race 71 and the internal race 72 is a plurality of sprags 74, as well as a spring or resilient element 75. The sprags 74 are metallic elements configured to have a center of gravity which, under the influence of centrifugal force, will tend to move radially outward and move the sprags 74 out of contact with the cylindrical race 71.

FIG. 6 shows the sprag clutch 70 as configured for use as the primary engagement assembly 21, here the sprags 74 are adapted for rotation with the radially outer cylinder 73. Outer cylinder 73 is part of the drive shaft assembly 23 and internal race 72 is part of the hub internal gear assembly 26. Similar to the primary pawls 60 of FIGS. 1–5, the sprag elements are normally positionally biased by the resilient element 75 so as to be in contact with both the cylindrical driving race 71 and the internal race 72 as shown in the top half of the FIGURE. However, the sprags 74 may also pivot about their center of gravity under the influence of centrifugal force so as to not contact the cylindrical driving race 71 as shown in the bottom half of the FIGURE. When the starter assembly 10 is driving in a normal start sequence, the cylindrical driving race 71, which is a part of the hub internal gear assembly 20, begins to rotate while the internal race 72 of the outer cylinder 73 and drive shaft assembly 23 are stationary. This relative motion induces a "rolling" motion in the sprags 74, causing them to wedge into engagement with the cylindrical driving race 71 and internal race 72, transferring torque via the sprags 74. Sprags 74 will maintain engagement and allow the starter assembly 10 to drive the engine 11 to a self-sustaining combustion speed. After an engine start, when torque is no longer being transferred, the sprags 74 are balanced such that the centrifugal forces acting on sprags 74 will cause them to rotate counter to the force of the resilient element 75 and out of contact with the cylindrical driving race 71, so as to prevent continuous frictional wear. When the engine 11 is shut down, the rotational speed of the drive shaft assembly 23 will deteriorate, and the centrifugal forces acting on sprags 74 will diminish until at some speed, analogous to the second threshold speed described with reference to FIGS. 2–5 above, the resilient element 75 will bias the sprags 74 into slipping contact with cylindrical driving race 71.

FIG. 7 shows how a sprag clutch 70' may be utilized as the secondary engagement assembly 22. When used as the secondary engagement assembly 22, a frame 80 is adapted for rotation with the secondary driving race 81. The secondary driving race 81 replaces the generally triangular projection 48 while secondary sprags 82 replace secondary pawls 49 of the hub internal gear assembly 20. Similarly, a secondary internal race 83 replaces the internal ratchet teeth 62 of the drive shaft assembly 23. The frame 80 of the sprag clutch assembly 70', also includes a second spring or resilient element 84. The resilient element 84 tends to bias the secondary sprags 82 toward the secondary driving race 81.

The secondary sprags 82 are pivotal about their center of gravity and have a shoulder 85 which contacts the frame 80 under the influence of second resilient element 84 to thereby bias the secondary pawls 82 out of contact with the secondary internal race 83, as shown in the bottom half of the FIGURE. The secondary sprags 82 are, however, balanced such that under the influence of a predetermined centrifugal force, secondary sprags 82 will pivot into contact with the secondary internal cylinder 83 as shown in the top half of the FIGURE. Thus, similar to the behavior of secondary pawls 49 of FIGS. 2-5, the secondary sprags 82 will rotate with the hub internal gear assembly 20 as a start cycle is initiated. Upon reaching a first threshold rotational speed, the secondary sprags 82 will rotate into contact with the secondary internal race 83 (top half). During a normal start sequence, the primary engagement assembly 21 is engaged and thus there will be no relative motion between the secondary internal race 83 and the driving race 81, and secondary sprags 82 will not be required to transmit torque. However, during an engine restart, the speed of the engine 11 decreases from a relatively high value and the primary engagement assembly 21 is disengaged. As the speed of the hub internal gear assembly 20 surpasses the first threshold speed, the secondary sprags pivot into contact with the secondary internal race 83. Whenever the speed of the secondary driving race 81 attempts to exceed the speed of the secondary internal race 83, the secondary sprags 82 pivot about their axis and wedge into engagement with the two races 83, 81. Thus, the secondary sprags 82 transmit torque and drive the engine 11 back up to the engines self-sustaining combustion speed. As the engine 11 then continues to accelerate to higher speeds, the speed of the secondary internal race 83 exceeds the speed of secondary driving race 81 and the secondary sprags 82, overruns with only sliding contact with secondary sprags 82 until the speed of the starter assembly 10 decrease to less than the first threshold engagement speed. Sprags 82 then disengage from race 83.

For either of the two types of clutches described above, the pawl and ratchet or sprag, the amount of wear which occurs during normal operation is critical. It is necessary that the drive shaft assembly 23 be fixedly linked to the engine 11 and thus always rotates with the engine 11. It is preferable that any ratcheting of the pawls or wear of the sprags be minimized. For the double clutch system there will always be tradeoffs between the amount of resilient biasing force desired for the primary and secondary engagement 21 and 22. To minimize wear of the components of primary engagement element 22 it is desirable to have the biasing force maintaining engagement to be very low, so that the second threshold speed is very low. It is required within the starter assembly 10 that the first threshold speed is less than the second threshold speed. It is also desirable that the primary engagement assembly 21 has a very high reliability. By way of example, for the starter assembly 10 of the present invention, operating with a gas turbine engine 11 which initiates combustion at about 3800 rpm and attains self-sustaining combustion at about 7400 rpm, preferred speeds for the first threshold speed is approximately 1200 rpm, the second threshold speed is approximately 2000 rpm, and an overrunning speed of from 9,000 to 10,000 rpm. These speeds will depend upon the design requirements of the starter and engine.

Many modifications and variations to the foregoing detailed description will become apparent to those skilled in the art. It is therefore to be understood that the scope of the invention is not limited by the preceeding description, but only by the appended claims.

Having described the invention in sufficient detail that those skilled in the art may make and use it, what is claimed is:

1. A starter for a gas turbine engine comprising:
   turbine means adapted to receive motive gas flow and for producing high speed low torque output;
   gear transmission means associated with said turbine means, for changing said high speed low torque output of said turbine means to a low speed high torque output;
   drive shaft means for transmitting rotational power from the starter to the gas turbine engine;
   gear assembly adapted to be supported on bearings and rotatably driven by said gear transmission means;
   a driven assembly attached to said drive shaft means;
   a double pawl and ratchet clutch assembly having primary pawls carried on said driven assembly, secondary pawls carried on said gear assembly, an external ratchet cylinder carried on said driven assembly, and an internal ratchet cylinder carried on said gear assembly, said driven assembly and said gear assembly configured to have said primary pawls operative with said external ratchet cylinder and said secondary pawls operative with said internal ratchet cylinder; and
   resilient biasing means associated with each of said primary and secondary pawls for biasing said primary and second pawls radially inward against centrifugal forces, and for allowing running engagements of said driven assembly while preventing said driving assembly from attaining a rotational speed in excess of said driven assembly.

2. A starter for a gas turbine engine comprising:
   turbine means adapted to receive motive gas flow and for producing high speed low torque output;
   gear transmission means associated with said turbine means, for changing said high speed low torque output of said turbine means to a low speed high torque output;
   drive shaft means for transmitting rotational power from the starter to the gas turbine engine;
   a gear assembly supported on bearings and rotatably driven by said gear transmission means;
   a driven assembly attached to said drive shaft means;
   a double sprag clutch assembly having a plurality of primary sprags contained within a frame attached to said driven assembly, and a plurality of secondary sprags contained within a secondary frame attached for rotation with said gear assembly, said gear assembly and said driven assembly configured to have said primary sprags operative to engage and transmit torque from a cylindrical driving race attached to said gear assembly, and said secondary sprags operative to engage and transmit torque to an internal race of said driven assembly; and
   resilient biasing means associated with each of said primary sprags and said secondary sprags for biasing said primary and said secondary sprags radially inward against centrifugal forces and for allowing running engagements of said driven assembly while preventing said driving assembly from attaining a rotational speed in excess of said driven assembly.

3. A starter for a gas turbine engine comprising:
   turbine means adapted to receive motive gas flow and for producing high speed low torque output;
   gear transmission means associated with said turbine means, for changing said high speed low torque output of said turbine means to a low speed high torque output;
   drive shaft means for transmitting rotational power form the starter to the gas turbine engine;
   a driving assembly attached to said gear transmission means;

a driven assembly attached to said drive shaft means;

primary engagement means resiliently biased and secured for rotation with said driven assembly, for transferring a torque load from said driving assembly at synchronous rotational speeds below a threshold rotational speed of said driven assembly, and for disengaging said driven assembly from said driving assembly when said torque load is removed; and secondary engagement means, resiliently biased and secured for rotation with said driving assembly, for response to centrifugal forces causing said secondary engagement means to contact said driven assembly at a speed below said threshold speed, and for allowing running engagements of said driven assembly while preventing said driving assembly from attaining a rotational speed in excess of said driven assembly.

4. The clutch of claim 3 wherein said primary engagement means compromises:

a set of primary pawls pivotally mounted on the driven assembly.

resilient spring elements associated with each of said primary pawls for biasing said primary pawls radially inward; and external ratchet teeth carried on said driving assembly and located radially inward of said primary pawls, said primary pawls configured for engaging said external ratchet teeth.

5. The clutch of claim 3 wherein said secondary engagement means compromises:

a set of secondary pawls pivotally mounted on the driving assembly;

secondary resilient spring elements associated with each of said secondary pawls for biasing said secondary pawls radially inward against centrifugal forces; and internal ratchet teeth carried on said driven assembly and located radially outward of said secondary pawls, said secondary pawls configured for engaging said internal ratchet teeth.

6. The clutch of claim 3 wherein said primary engagement means comprises:

an outer cylinder connected to said driving assembly, said outer cylinder having an internal race;

a cylindrical driving race, secured for rotation with said driving assembly, disposed radially inward of said internal race;

a plurality of sprags disposed between said cylindrical driving race and said internal races, adapted for engaging said cylindrical driving race and said internal race and for transferring torque therebetween;

a frame containing said plurality of sprags, said frame including an inner cage, an outer cage, and a resilient element for biasing said sprags, said frame being connected for rotation with said driven assembly.

7. The clutch of claim 3 wherein said secondary engagement means compromises:

an outer cylinder connected to said driven assembly, said outer cylinder having a secondary internal race;

a secondary cylindrical driving race, secured for rotation with said driving assembly, disposed radially inward of said secondary internal race;

a plurality of secondary sprags, disposed between said secondary cylindrical driving race and said secondary internal races, adapted for engaging said cylindrical driving race and said internal race and for transferring torque therebetween; and a frame containing said plurality of sprags, said frame including an inner cage, an outer cage, and a resilient element for biasing said sprags, said frame being connected for rotation with said driving assembly.

8. The clutch of claim 4 wherein said secondary engagement means comprises:

an outer cylinder connected to said driven assembly, said outer cylinder having a secondary internal race;

a secondary cylindrical driving race, secured for rotation with said driving assembly, disposed radially inward of said secondary internal race;

a plurality of secondary sprags, disposed between said secondary cylindrical driving races and said secondary internal races adapted for engaging said cylindrical driving race and said internal race and for transferring torque therebetween; and a frame containing said plurality of sprags, said frame including an inner cage, outer cage, and a resilient element for biasing said sprags, said frame being connected for rotation with said driving assembly.

9. The clutch of claim 6 wherein said secondary engagement means compromises:

a set of secondary pawls pivotally mounted on the driving assembly;

secondary resilient spring elements associated with each of said secondary pawls for biasing said secondary pawls radially inward against centrifugal forces; and internal ratchet teeth carried on said driven assembly and located radially outward of said secondary pawls, said secondary pawls configured for engaging said internal ratchet teeth.

10. An assembly for starting a turbine engine comprising:

starter means for producing output rotational motion of a driving assembly;

drive shaft means connected to said engine for receiving rotational motion from said starter means;

a driven assembly attached to said drive shaft;

primary engagement means resiliently biased and secured for rotation with said driven assembly, for transferring a torque load from said driving assembly to said driven assembly, said primary engagement means for initially engaging said driving assembly at synchronous rotational speeds below a threshold rotational speed of said driven assembly, and for disengaging said driven assembly from said driving assembly when said torque load is removed; and secondary engagement means, resiliently biased and secured for rotation with said driving assembly, for response to centrifugal forces causing said secondary engagement means to contact said driven assembly at a speed below said threshold speed, and for allowing running engagements of said driven assembly while preventing said driving assembly from attaining a rotational speed in excess of said driven assembly.

11. The assembly of claim 10 wherein said primary engagement means compromises:

a set of primary pawls pivotally mounted on the driven assembly;

resilient spring elements associated with each of said primary pawls for biasing said primary pawls radially inward; and external ratchet teeth carried on said driving assembly and located radially inward of said primary pawls, said primary pawls configured for engaging said external ratchet teeth.

12. The assembly of claim 10 wherein said secondary engagement means compromises:

a set of secondary pawls pivotally mounted on the driving assembly;

secondary resilient spring elements associated with each of said secondary pawls for biasing said secondary pawls radially inward against centrifugal forces; and internal ratchet teeth carried on said driven assembly and located radially outward of said secondary pawls, said secondary pawls, said secondary pawls configured for engaging said internal ratchet teeth.

13. The assembly of claim 10 wherein said primary engagement means compromises:

an outer cylinder connected to said driving assembly, said outer cylinder having an internal race;

a cylindrical driving race, secured for rotation with said driving assembly, disposed radially inward of said internal race;

a plurality of sprags disposed between said cylindrical driving race and said internal race, adapted for engaging said cylindrical driving race and said internal race and for transferring torque therebetween;

a frame containing said plurality of sprags, said frame including an inner cage, outer cage, and a resilient element for biasing said sprags, said frame being connected for rotation with said driven assembly.

14. The assembly of claim 10 wherein said secondary engagement means compromises:

an outer cylinder connected to said driven assembly, said outer cylinder having a secondary internal race;

a secondary cylindrical driving race, secured for rotation with said driving assembly, disposed radially inward of said secondary internal race;

a plurality of secondary sprags, disposed between said secondary cylindrical driving race and said secondary internal races, adapted for engaging said cylindrical driving race and said internal race and for transferring torque therebetween; and a frame containing said plurality of sprags, said frame including an inner cage, outer cage, and a resilient element for biasing said sprags, said frame being connected for rotation with said driving assembly.

15. The assembly of claim 11 wherein said secondary engagement means comprises:

an outer cylinder connected to said driven assembly, said outer cylinder having a secondary internal race;

a secondary cylindrical driving race, secured for rotation with said driving assembly, disposed radially inward of said secondary internal race;

a plurality of secondary sprags, disposed between said secondary cylindrical driving races and said secondary internal races adapted for engaging said cylindrical driving *race and said internal race and for transferring torque therebetween; and a frame containing said plurality of sprags, said frame including an inner cage, outer cage, and a resilient element for biasing said sprags, said frame being connected for rotation with said driving assembly.

16. The assembly of claim 13 wherein said secondary engagement means compromises:

a set of secondary pawls pivotally mounted on the driving assembly;

secondary resilient spring elements associated with each of said secondary pawls for biasing said secondary pawls radially inward against centrifugal forces; and internal ratchet teeth carried on said driven assembly and located radially outward of said secondary pawls, said secondary pawls configured for engaging said ratchet teeth.

* * * * *